(12) United States Patent
Asano (10) Patent No.: US 7,603,313 B2
(45) Date of Patent: *Oct. 13, 2009

(54) CHARGING SYSTEM AND CHARGING METHOD

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1260 days.

This patent is subject to a terminal disclaimer.

(21) Appl. No.: 09/880,558

(22) Filed: Jun. 13, 2001

(65) Prior Publication Data

US 2004/0015448 A1 Jan. 22, 2004

Related U.S. Application Data

(62) Division of application No. 08/865,403, filed on May 29, 1997, now Pat. No. 7,412,423.

(30) Foreign Application Priority Data

Jun. 7, 1996 (JP) .............................. P08-145358

(51) Int. Cl.
*G06Q 20/00* (2006.01)
(52) U.S. Cl. .............................. 705/40; 705/16; 705/17; 705/26; 705/27; 705/39; 705/41; 705/42; 705/43
(58) Field of Classification Search .................. 705/16, 705/17, 26, 27, 39–43
See application file for complete search history.

(56) References Cited

U.S. PATENT DOCUMENTS

| 4,823,388 A | 4/1989 | Mizutani et al. |
| 5,018,196 A | 5/1991 | Takaragi et al. |
| 5,220,501 A | 6/1993 | Lawlor et al. |
| 5,406,555 A | 4/1995 | Yoshida |
| 5,613,012 A | 3/1997 | Hoffman et al. |
| 5,671,279 A | 9/1997 | Elgamal |

(Continued)

FOREIGN PATENT DOCUMENTS

DE 42 22 235 A 1/1994

(Continued)

OTHER PUBLICATIONS

U.S. Appl. No. 09/880,173, Non-Final Office Action of Jan. 11, 2008.

(Continued)

*Primary Examiner*—Nga B. Nguyen
(74) *Attorney, Agent, or Firm*—Sonnenschein Nath & Rosenthal LLP (57) ABSTRACT

A user sends data for requesting a service provider to provide predetermined service and signature data created based upon the data to the service provider, the service provider calculates a fee based upon this data and requests a bank to collect the fee from the user. The bank informs the user of the fee requested from the service provider. When the user protests against the amount of the fee, the service provider discloses the data and signature data received from the user to the bank and when the bank judges based upon this signature data that this data is valid, it calculates a proper fee based upon this data and collects it from the user. As described above, it is enabled to collect a proper fee for service.

5 Claims, 6 Drawing Sheets

U.S. PATENT DOCUMENTS

| | | | |
|---|---|---|---|
| 5,696,824 | A | 12/1997 | Walsh |
| 5,699,528 | A | 12/1997 | Hogan |
| 5,790,677 | A | 8/1998 | Fox et al. |
| 5,809,144 | A | 9/1998 | Sirbu et al. |
| 5,852,812 | A | 12/1998 | Reeder |
| 5,878,141 | A | 3/1999 | Daly et al. |
| 5,884,271 | A * | 3/1999 | Pitroda ............................ 705/1 |
| 5,920,847 | A | 7/1999 | Kolling et al. |
| 6,038,551 | A * | 3/2000 | Barlow et al. .................. 705/41 |
| 6,055,314 | A * | 4/2000 | Spies et al. .................. 380/228 |
| 6,252,869 | B1 | 6/2001 | Silverman |
| 6,560,581 | B1 | 5/2003 | Fox et al. |

FOREIGN PATENT DOCUMENTS

| | | |
|---|---|---|
| EP | 0 412 298 A | 2/1991 |
| EP | 0 542 298 A | 5/1993 |
| EP | 0 647 052 A | 4/1995 |
| JP | 408287202 A | 11/1996 |

OTHER PUBLICATIONS

U.S. Appl. No. 09/880,173, Amendment Accompanying RCE, dated Oct. 24, 2007.
U.S. Appl. No. 08/865,403, Decision on Appeal, Appeal 2006-3185.
"The Nuts and Bolts of SET", Bank Technology News, p N/A, May 1, 1996.
Rodriguez, Karen, "Safety on the Net: Can encryption offer peace of mind to nervous network managers?", Communications Week, n602, p1(3), Mar. 25, 1996.
Kaplan et al., "Unscrambling the secret of encryption", Security Management, v39, n2, p67(4), Feb. 1995.
"Commerce On The Net: What's the Holdup?", Open Systems Today, n162, p38+, Oct. 31, 1994.

* cited by examiner

CHARGING SYSTEM AND CHARGING METHOD

CROSS REFERENCE TO RELATED APPLICATIONS

This is a divisional of U.S. application Ser. No. 08/865,403, filed on May 29, 1997 now U.S. Pat. No. 7,412,423, which claims priority to Japanese Application No. P08-145358, filed Jun. 7, 1996, all of which are incorporated herein by reference to the extent permitted by law.

BACKGROUND OF THE INVENTION

1. Field of the Invention

The present invention relates to a charging system and a charging method for electronic commerce system, for example relates to a charging system and the method for providing service via a network and enabling proper charging processing.

2. Description of Related Art

For an example of service via a network, network connection service by a group called a network provider can be given. The brief description of this service is as follows:

A user connects his/her terminal provided with a modem function to a terminal provided by a network provider via a public telephone line. The network provider connects his/her terminal to, for example the Internet and sets so that the user can connect to the Internet from his/her terminal.

At this time, the network provider calculates a fee for the use of the user based upon time during which the user connects to the Internet, informs the user of the calculated fee and informs a bank where the user has an account and others of the beforehand known account number of the user. Hereby, the bank transfers an amount equivalent to the above fee for the use from the account of the user to the account of the network provider.

As described above, a service provider provides service to users, charges a fee for the use of a user and can receive an amount equivalent to the fee.

However, there is a problem in the charging method of a conventional type network service in that even if a network provider charges a user a greater amount than an amount to be properly charged, it is difficult for the user to clarify this fact.

There is also a problem in that it is also difficult for a network provider to prove that it is charging a user a proper fee.

SUMMARY OF THE INVENTION

The present invention is made to solve such a situation. The object of the present invention is to enable a user to prove that a service provider charges a wrong fee and to enable a service provider to prove that he/she charges a user a proper fee.

A charging system according to one aspect of the present invention is characterized in that the system is provided with fee collection means for collecting a fee equivalent to service which a service provider provides to a user from the user independent of the service provider.

A charging method according to another aspect of the present invention is characterized in that a fee equivalent to service which a service provider provides to a user is collected from a user independent of the service provider.

In the charging system disclosed herein a fee collection means collects a fee equivalent to service provided to a user by a service provider from the user independent of the service provider.

In the charging method disclosed herein, a fee equivalent to service provided to a user by the service provider is collected from the user independent of the service provider.

DESCRIPTION OF THE PREFERRED EMBODIMENTS

Figure 1:
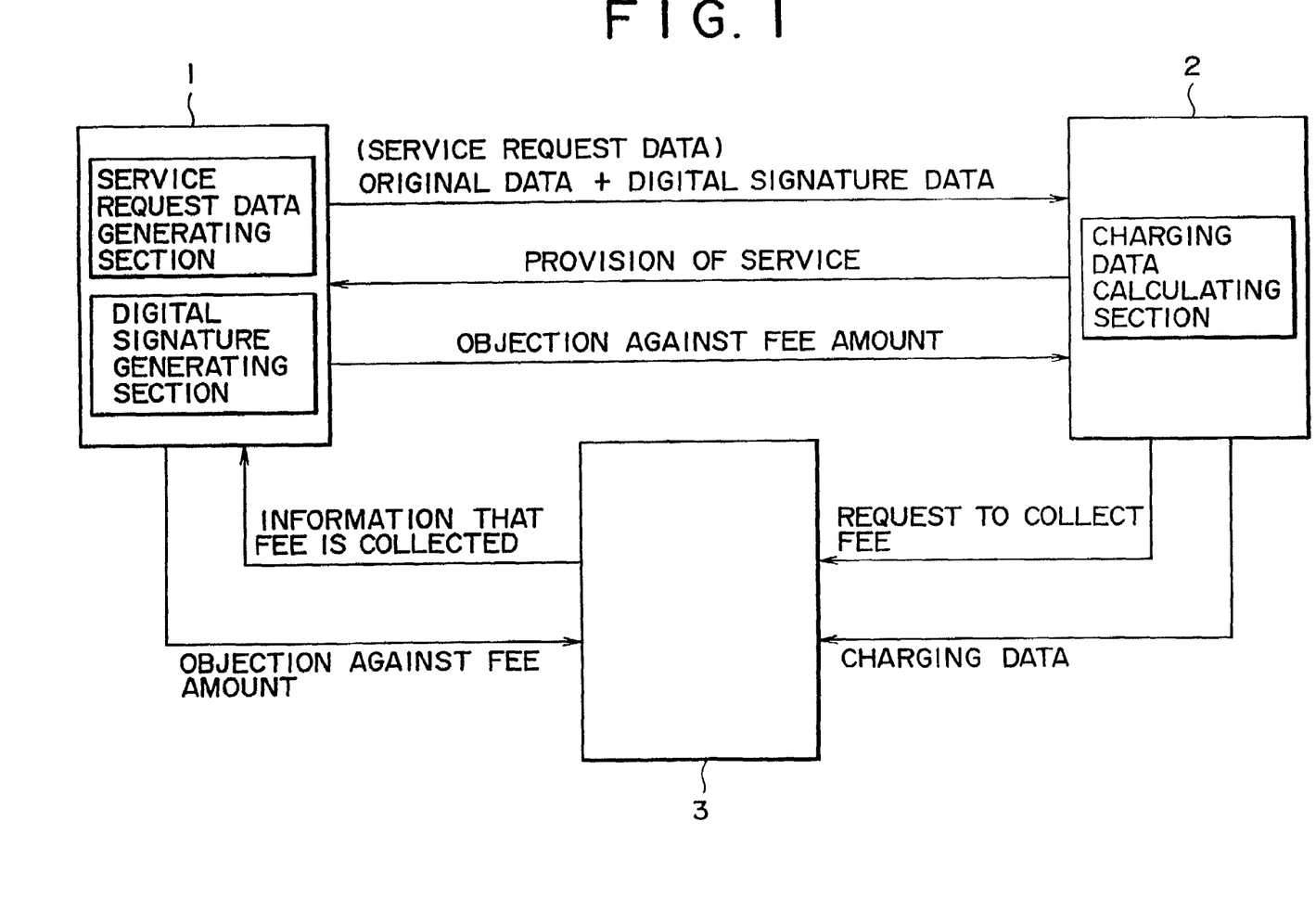
FIG. 1 is a block diagram showing an example of the configuration of a service providing system applying a charging system according to the present invention.

FIG. 1 is a block diagram showing the configuration of an embodiment of a service providing system applying a charging system according to the present invention. A user 1 requests a service provider 2 to provide a predetermined service. The service provider 2 provides the predetermined service to the user 1 in response to the request from the user 1, charges the user 1 a fee equivalent to the service and requests a bank 3 (fee collection means) to collect the fee from the user 1. The bank 3 collects the fee from the user 1 in response to the request from the service provider 2.

Figure 2:
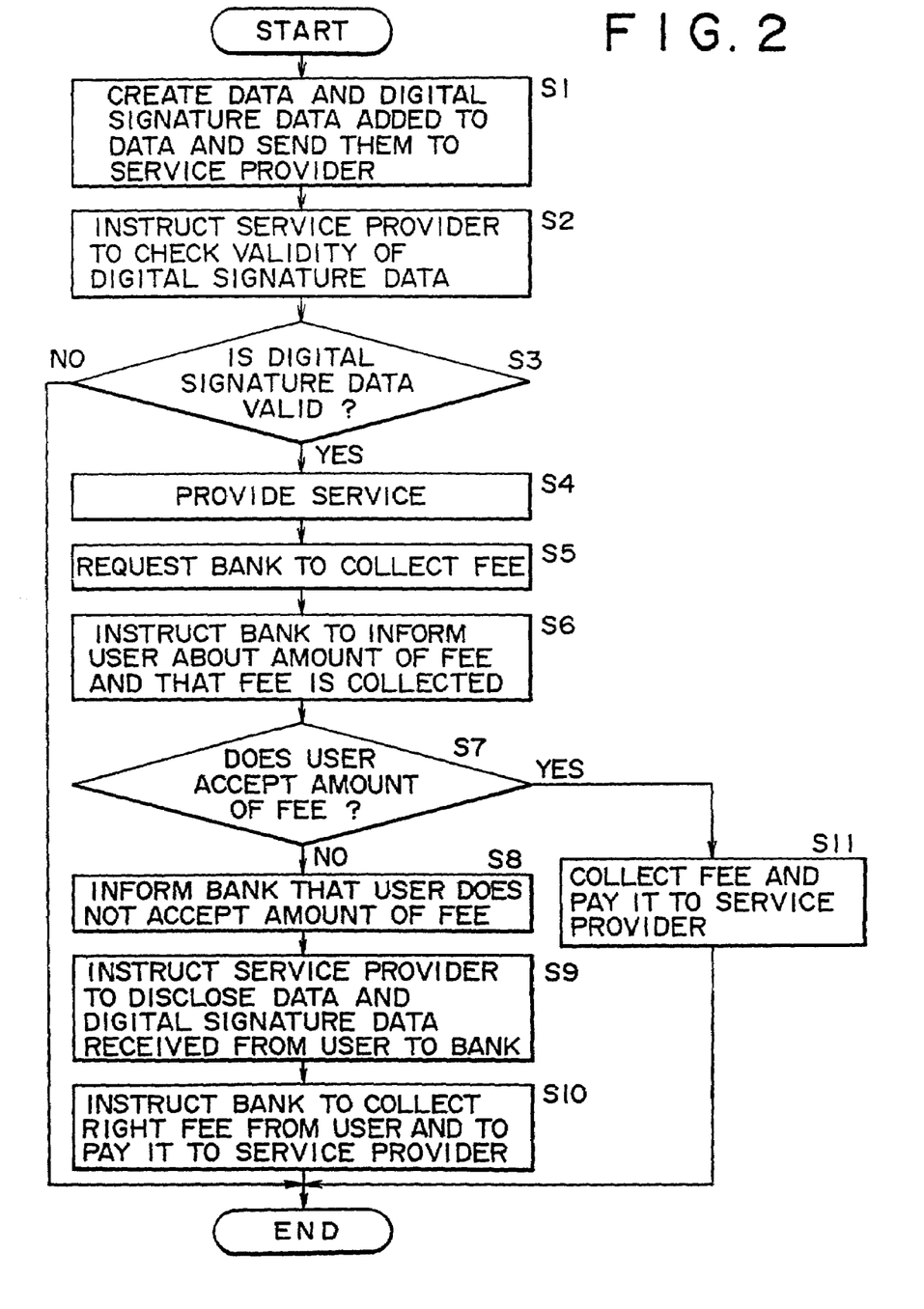
FIG. 2 is a flowchart for explaining the operation of the service providing system shown in FIG. 1.

Next, referring to a flowchart shown in FIG. 2, the operation will be described below. First, in a step S1, a user 1 creates data (hereinafter called service request data) including, for example the name and the account number of the user 1, the name of a service provider 2, the name of service to be provided, a date, time and a hour/minute/second for service to be provided and the contents of service and digital signature data for the above data when the user utilizes service provided by the service provider 2 and sends the service request data and the digital signature data to the service provider 2.

Digital signature data can be created by adding a digital signature to original data, in this case service request data. Technique used for a digital signature is the one which enables only a signer to create specific data (digital signature data) in addition to original data and enables a third person to verify this digital signature data is based upon the original data of the signer. The details are described in "Contemporary Encryption Theory" written by Mrs. Shinichi Ikeno and Kenji Koyama and published by an incorporated body, Institute of Electronics and Communication Engineers of Japan (IECE).

Next, in a step S2, the service provider 2 checks whether digital signature data received from the user 1 is valid or not. Next, in a step S3, as a result of the check in the step S2, it is judged by the service provider 2 whether the digital signature data received from the user 1 is valid or not. If the received digital signature data is judged invalid, processing is terminated. In the meantime, if the received digital signature data is judged valid, processing proceeds to a step S4 and in case the service provider 2 allows this user 1 to utilize service, he/she provides service to the user 1.

For example, if the user does not pay a fee for former service, the service provider 2 does not provide service to the user.

Next, in a step S5, the service provider 2 informs a bank 3 of the name and account number of the user 1 and the amount of the fee and requests the bank to collect the fee from the user 1. In a step S6, the bank 3 informs the user 1 of the amount of the fee and that the fee is to be collected. Next, in a step S7, if the user 1 does not accept the amount of the fee, processing proceeds to a step S8 and for example, the user 1 informs the service provider 2 and the bank 3 that the user cannot accept the amount in a predetermined period and further, the user 1 requests the service provider 2 to disclose the service request data and digital signature data already sent to the service provider 2.

In a step S9, the service provider 2 discloses the above service request data and digital signature data already sent from the user 1, that is, data for a fee to the bank 3. Next, in a step S10, the bank 3 checks whether the service request data and digital signature data disclosed by the service provider 2 are valid or not and if the bank judges them valid, it calculates a proper fee based upon them, collects it from the user 1 and pays it to the service provider 2.

In the meantime, in a step S7, if the user 1 accepts the fee informed by the bank 3, processing proceeds to a step S11, the bank 3 immediately collects the fee from the user 1 and pays it to the service provider 2.

When processing in the step S10 or S11 is finished, processing is terminated.

In the above embodiment, as described above, both in case an amount charged by the service provider 2 is right and wrong, a fact can be disclosed. For example, if the service provider 2 charges the user 1 a right fee, the service provider 2 can disclose the fact and if the service provider charges the user a wrong fee, the user 1 can disclose the fact. This is because service is not provided until the user 1 sends data which requests the use of service (service request data) and digital signature data which only the user 1 can create and is added to the above data to the service provider 2.

That is, if the service provider 2 has service request data and digital signature data sent from the user 1 because the service provider 2 cannot forge digital signature data, he/she can prove that a right fee is charged the user 1. When it is indicated by the user 1 that the service provider 2 charges the user 1 a wrong fee in case the indication is right, the service provider 2 cannot prove that the fee is valid.

Figure 3:
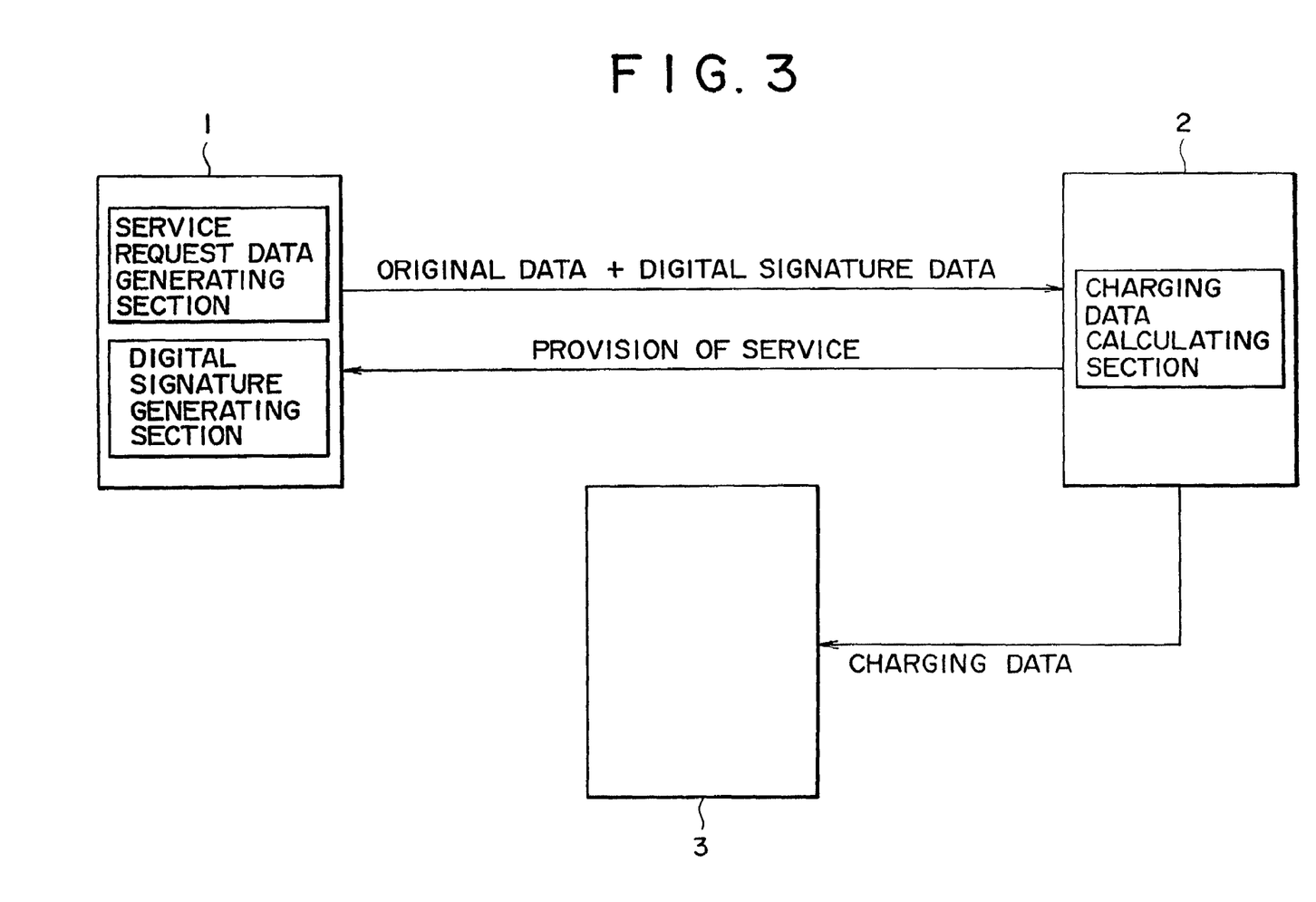
FIG. 3 is a block diagram showing an example of another configuration of the service providing system applying the charging system according to the present invention.

FIG. 3 is a block diagram showing an example of a configuration of another embodiment of a service providing system applying a charging system according to the present invention. In the case of this example, a user 1 requests a service provider 2 to provide predetermined service. The service provider 2 provides predetermined service to the user 1 in response to the request from the user 1, charges a fee for the service to the user 1 and requests a bank 3 to collect the fee from the user 1. The bank 3 collects the fee from the user 1 in response to the request from the service provider 2.

Figure 4:
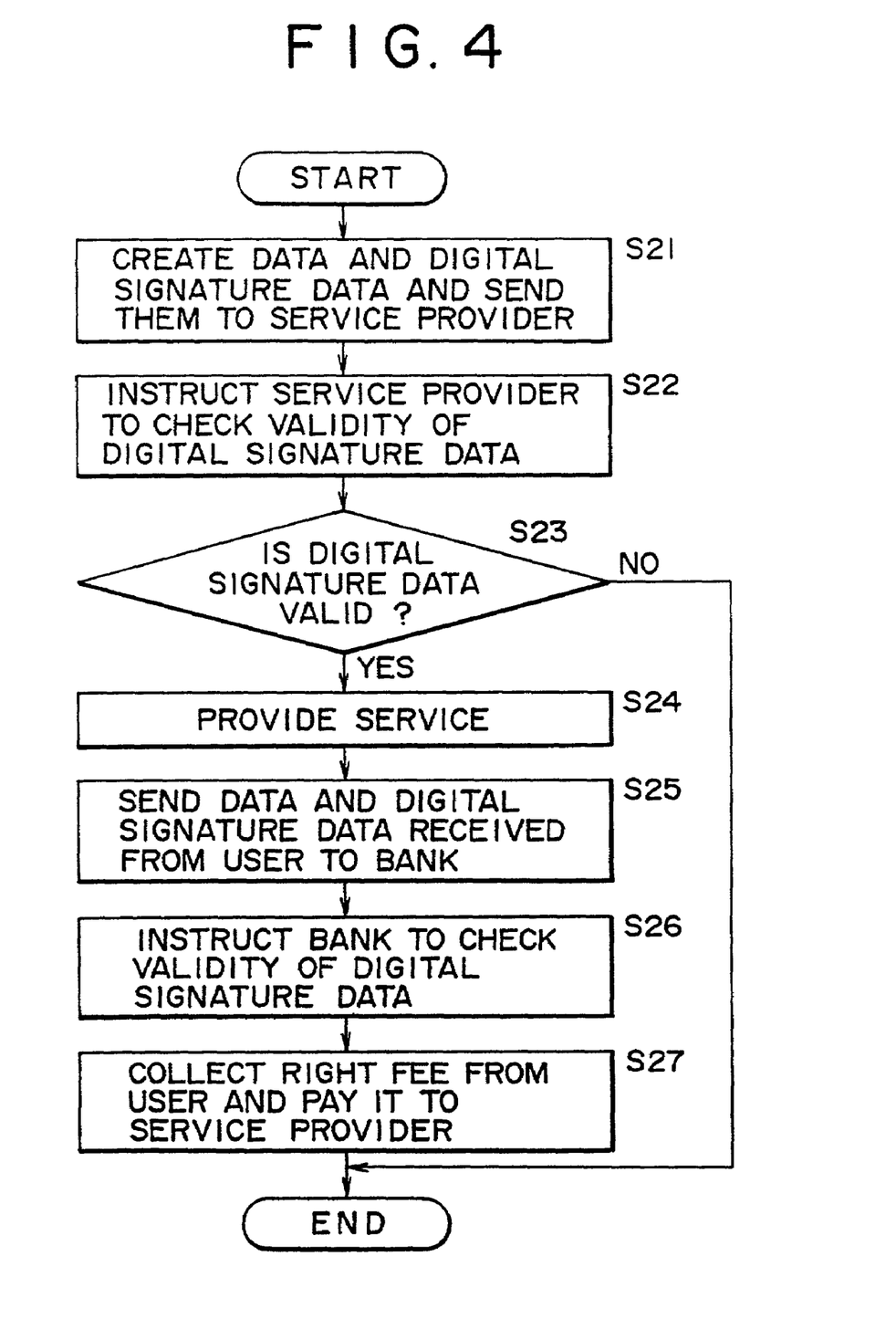
FIG. 4 is a flowchart for explaining the operation of the service providing system shown in FIG. 3.

Next, referring to a flowchart shown in FIG. 4, the operation will be described. First, in a step S21, when a user 1 utilizes the service provided by a service provider 2, he/she creates service request data and digital signature data added to the service request data as in the above case shown in FIG. 2 and sends the service request data and digital signature data to the service provider 2.

Next, processing proceeds to a step S22 and the service provider 2 checks whether the digital signature data received from the user 1 is valid or not. Next, in a step S23, as a result of the check in the step S22, it is judged by the service provider 2 whether the digital signature data received from the user 1 is valid or not. If the received digital signature data is judged invalid, processing is terminated. In the meantime, if the received digital signature data is judged valid, processing proceeds to a step S24 and if the service provider 2 allows the user 1 to utilize service, he/she provides service to the user 1.

Next, in a step S25, the service provider 2 sends the service request data and digital signature data (data for a fee) received from the user 1 to a bank 3 and requests the bank to collect a predetermined fee from the user 1. In a step S26, the bank 3 checks whether the digital signature data sent from the service provider 2 is valid or not. If the digital signature data is valid, the bank 3 calculates a right fee based upon the service request data sent from the service provider 2, immediately collects it from the user 1 and pays it to the service provider 2 in a step S27. Afterward, processing is terminated.

As described above, in the case of the embodiment shown in FIG. 3, as it is not possible that a user protests against the fee, a processing cost can be reduced by processing required for such objection.

Figure 5:
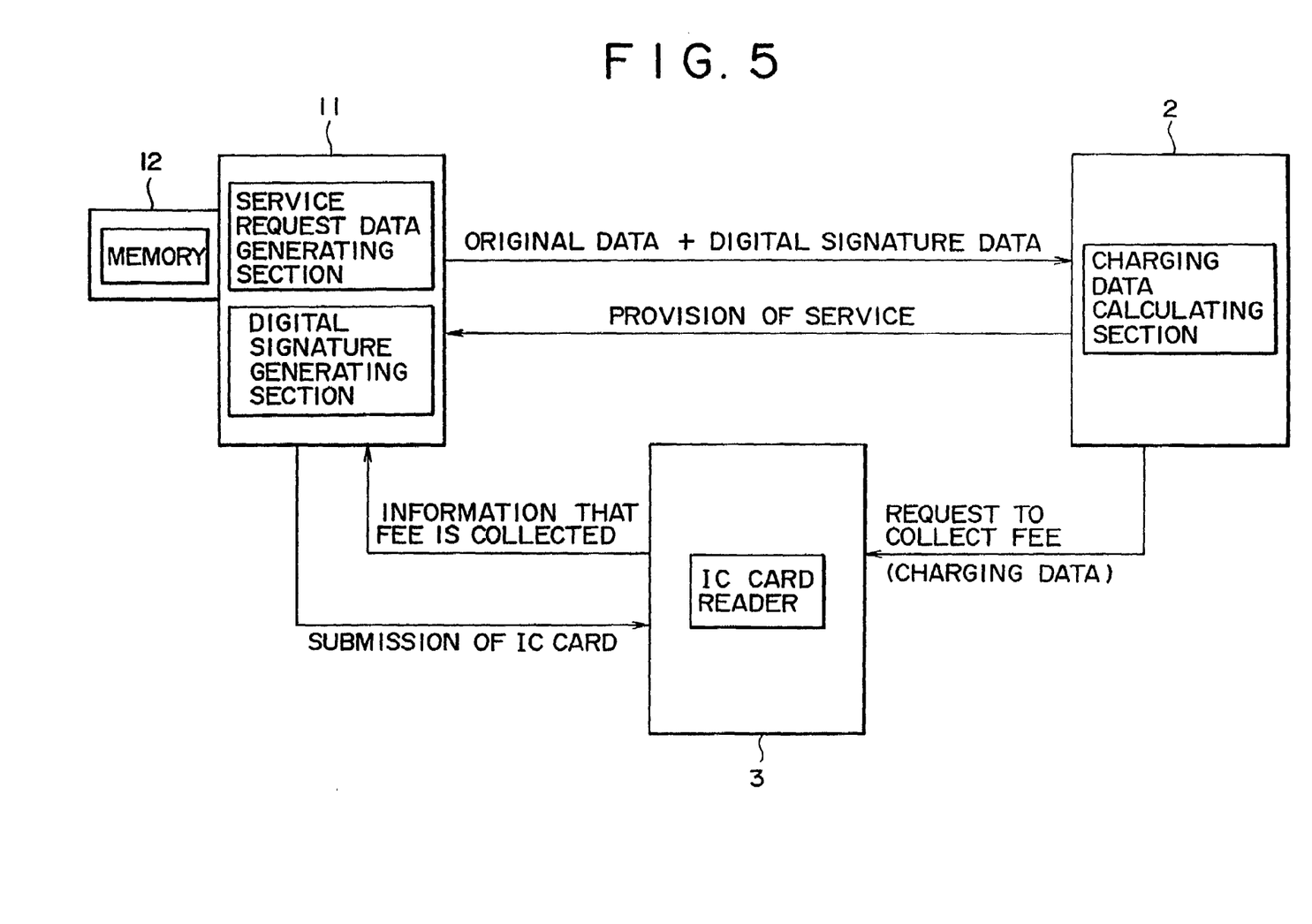
FIG. 5 is a block diagram showing an example of a further configuration of the service providing system applying the charging system according to the present invention.

FIG. 5 is a block diagram showing the configuration of yet a further embodiment of the service providing system applying the charging system according to the present invention. In the case of this example, an IC card 12 (storage means) is connected to the communication terminal 11 (hereinafter called a user communication terminal) of a user.

When a user communication terminal 11 requests a service provider 2 to provide predetermined service, data consisting of the contents of the request (service request data and digital signature data) is sent to the service provider 2 and is also automatically supplied to the IC card 12 and recorded in it. The service provider 2 provides predetermined service to the user 1 in response to the request from the user 1, charges the user 1 the fee and requests a bank 3 to collect the fee from the user 1. The bank 3 collects the fee from the user 1 in response to the request from the service provider 2.

Figure 6:
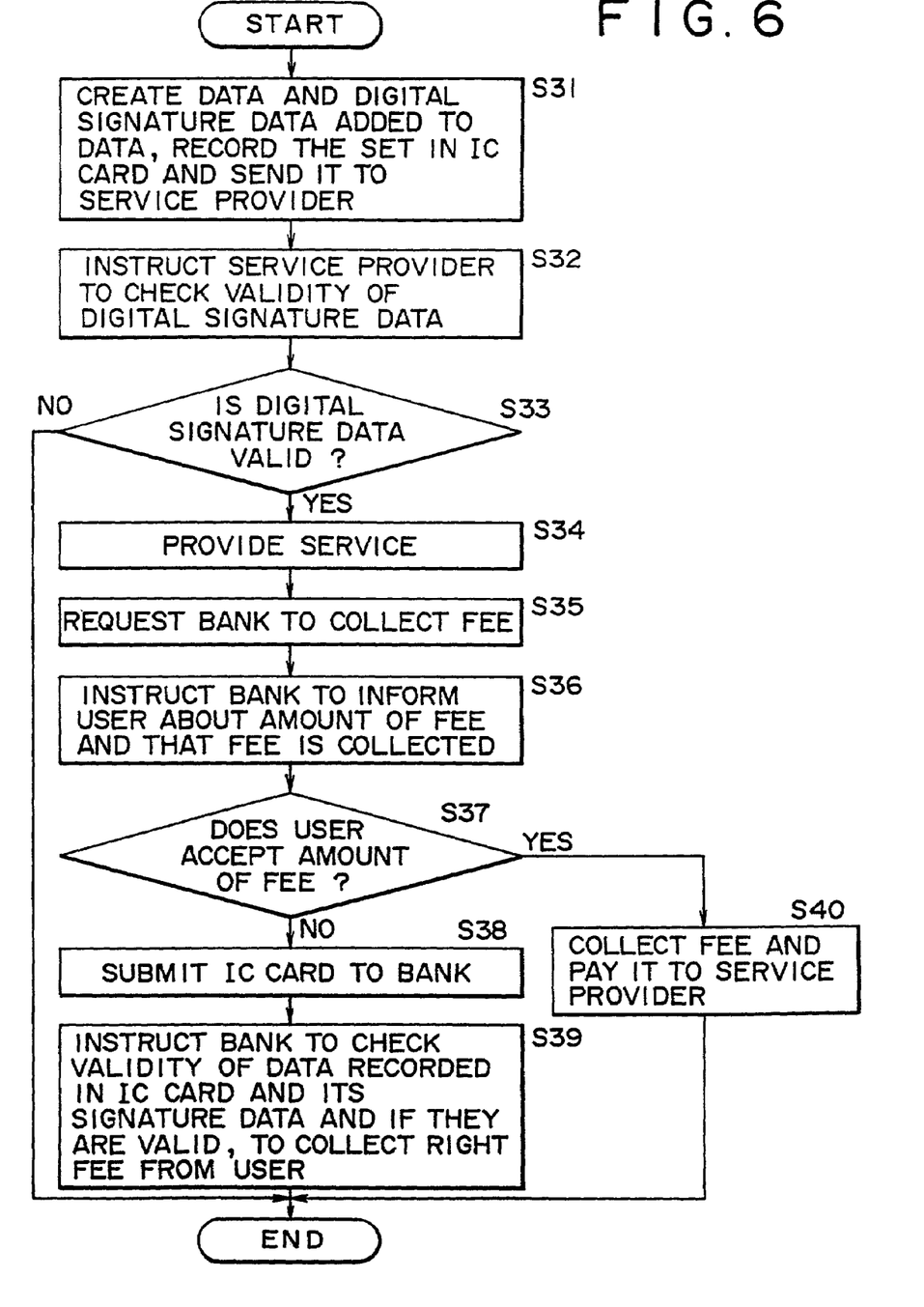
FIG. 6 is a flowchart for explaining the operation of the service providing system shown in FIG. 5.

Next, referring to a flowchart shown in FIG. 6, the operation will be described. First, in a step S31, a user communication terminal 11 creates service request data and digital signature data added to this data as in the above case referring to FIG. 2 when the user utilizes service provided by the service provider 2 and sends the service request data and digital signature data to the service provider 2. At this time, these service request data and digital signature data are automatically recorded in an IC card 12.

The IC card 12 is constituted by hardware so that it is easy to read the whole or a part of information recorded in it, however it is really impossible to modify the information or information is recorded in the IC card using a software technique.

Information (for example, personal information such as the name and the account number of a user using the user communication terminal 11) required for the user communication terminal 11 to create digital signature data is stored in the IC card 12 and digital signature data is created by a CPU provided to the IC card 12 according to a predetermined program. When digital signature data is created, the service request data and the digital signature data are always recorded in a memory built in the IC card 12.

Next, processing proceeds to a step S32 and the service provider 2 checks whether digital signature data sent from the user communication terminal 11 is valid or not. Next, in a step S33, as a result of the check in the step S32, it is judged by the service provider 2 whether the digital signature data received from the user communication terminal 11 is valid or not. If the received digital signature data is judged invalid, processing is terminated. In the meantime, if the received digital signature data is judged valid, processing proceeds to a step S34 and if the service provider 2 allows the user using this user communication terminal 11 to utilize service, it provides service to the user communication terminal 11.

Next, in a step S35, the service provider 2 sends, for example the name of the user using the user communication terminal 11 and the amount of a fee to be charged and others to a bank 3 and requests the bank to collect a predetermined fee equivalent to service provided to the user from the user. In a step S36, the bank 3 sends the user communication terminal 11 the amount of the fee and informs the user using the user communication terminal that the fee for the provided service is to be collected.

Next, in a step S37, if the user using the user communication terminal 11 accepts the amount of the fee informed by the bank 3, processing proceeds to a step S40, the bank 3 immediately collects the fee from this user, pays it to the service provider 2 and processing is finished.

In the meantime, if the user using the user communication terminal 11 does not accept the amount of the fee informed from the bank 3, processing proceeds to a step S38 and the user submits the IC card 12 connected to the user communication terminal 11 to the bank 3. Next, in a step S39, the bank 3 receives the IC card 12 from the user using the user communication terminal 11, reads service request data and digital signature data recorded there, checks their validity, if they are valid, calculates a right fee based upon the service request data, collects the fee from the user using the user communication terminal 11 and after the bank pays it to the service provider 2, processing is terminated.

As described above, in the case of the embodiment shown in FIG. 5, when a user using a user communication terminal 11 approves a right fee, the cooperation of a service provider 2 is not required. As described above, this is because data once recorded in an IC card 12 is disabled from being changed by a user, any data required for calculating a right fee (in this case, service request data and digital signature data) is recorded in an IC card 12 and the user can submit this data to a bank 3. That is, the bank can calculate the right fee based upon only data recorded in the IC card 12 submitted by the user without receiving any data from a service provider 2. Hereby, a processing procedure in charging can be simplified. In the above embodiments, a bank 3 collects a fee, however, the other third party may also collect it.

In the embodiment shown in FIG. 5, an IC card 12 is used, however, another recording medium may also be used.

According to a charging system and a charging method disclosed herein, as a fee equivalent to service provided to a user by a service provider is collected from the user independent of the service provider, the user can prove the fact of a wrong fee charged by the service provider and the service provider can prove the validity of a fee charged the user by the service provider. Therefore, a right fee equivalent to service provided to the user by the service provider can be collected from the user.

The invention claimed is:

1. A system for collecting a fee for a service of a service provider comprising:
   a request receiving unit which receives a request from said service provider to collect the fee from a user, said request including the amount of the fee;
   an IC card receiving unit which receives an IC card from the user, said IC card including service request data and digital signature data stored thereon, said IC card receiving unit being a physical device configured to read information stored on said IC card;
   a reading unit associate with said IC card receiving unit which reads said service request data and said digital signature data stored on said IC card;
   a determining unit which determines whether said service request data and said digital signature data are valid, said determining unit being a physical unit configured to conduct an electronic comparison being different items of electronic data; and
   a calculating unit which calculates the fee using the service request data on said IC card when it is determined that said service request data and said digital signature data are valid;
   wherein,
   said service request data is stored on said IC card in a physical way such that it cannot be modified using only a read and write process of a computer program, and
   said digital signature data is a function of said service request data.

2. The system according to claim 1, wherein said IC card stores said specific information which is used to generate said digital signature data.

3. The system according to claim 2, wherein said specific information includes personal information of the user.

4. The system according to claim 3 wherein said personal information includes a user name and a bank account number of the user.

5. The system according to claim 1, wherein said IC card is can be coupled to a user terminal, and said service request data and said digital signature data stored in said IC card are sent to the service provider after said IC card is presented to said user terminal.

* * * * *